N. I. Eldred
Eaves Trough,
Nº 33,076. Patented Aug. 20, 1861.

Witnesses.
C. M. Alexander
J. H. Alexander

Inventor.
N. I. Eldred

UNITED STATES PATENT OFFICE.

N. I. ELDRED, OF ELKHORN, WISCONSIN.

EAVES-TROUGH.

Specification of Letters Patent No. 33,076, dated August 20, 1861.

*To all whom it may concern:*

Be it known that I, N. I. ELDRED, of Elkhorn, county of Walworth, and State of Wisconsin, have invented certain new and useful Improvements in Eaves-Troughs; and I do hereby declare that the following is a full, clear, and exact description of the same, reference being had to the accompanying drawings and to the letters of reference marked thereon.

In the annexed drawings making a part of this specification A represents the trough which is made in the usual way.

C, C, C, represent the cross bars which serve to brace the trough and to which an attachment is made for sustaining it. These cross bars are formed in the manner represented in the figures one end being curved around the bead of the trough and a V-shaped piece being cut in the cross piece near to the bead which piece $d'$ is turned down as shown in Figure 2, in order to keep the brace C in proper position at that end.

Figure 2:
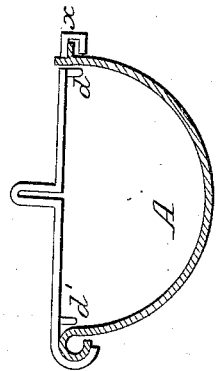
Figure 1:
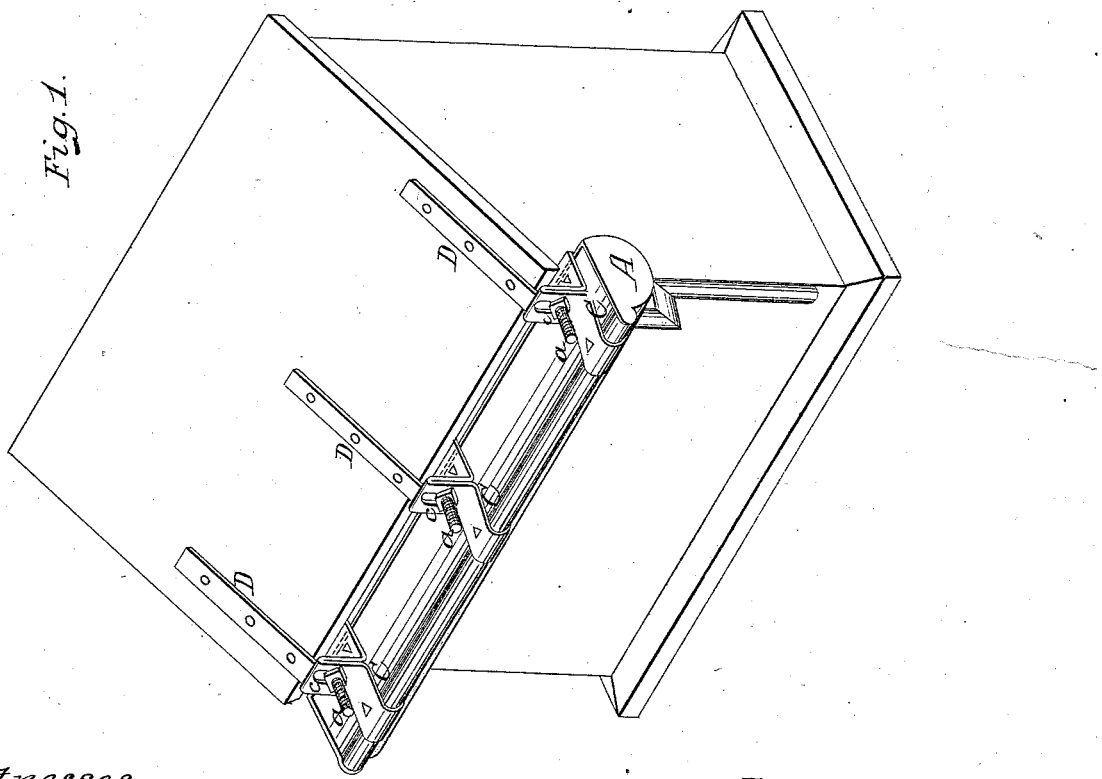

The trough is cut on the side opposite the bead so that a portion of it will turn down at right angles to the trough as shown in Fig. 2, and one end of the brace C is bent around this turned portion as seen at $x$, Fig. 2. In order to hold this end of the brace C in position a V-shaped piece is cut in it and turned down on the inside of the trough as shown at $d$.

The brace C is curved at its center or bent in the form shown and is provided with a slot through which a bolt $a$ passes.

D represents a bar or strap which is secured to the roof of the building to which the trough is to be secured; the bolt $a$ passes through the lower end of this bar.

$c$ represents a nut which passes over the bolt $a$. Two nuts may be used on this bolt, one on each side of the bend in the brace C, in order to regulate the distance of the trough from the building or the eaves. By means of the slot in the brace the trough may be adjusted vertically and held in position by means of the nuts $c$, which can be screwed up tight against the brace for this purpose.

This arrangement and construction makes a very effective and simple gutter or trough attachment and brace.

Having thus fully described my invention what I claim as new and desire to secure by Letters Patent is—

1. The employment of the cross bar C, constructed as represented and secured to the trough substantially as specified.

2. The combination of said cross bar C, as constructed, with the bar D, bolt $a$, and nut $c$, the several parts being arranged as and for the purpose herein specified.

N. I. ELDRED.

Witnesses:
 DANL. WEBSTER,
 ROBERT HOLLEY.